United States Patent [19]

Ogawa et al.

[11] 4,105,515
[45] Aug. 8, 1978

[54] PROCESS FOR ELECTROLYSIS OF ALKALI HALIDE

[75] Inventors: Shinsaku Ogawa; Muneo Yoshida, both of Nobeoka, Japan

[73] Assignee: Asahi Kasei Kogyo Kabushiki Kaisha, Osaka, Japan

[21] Appl. No.: 811,277

[22] Filed: Jun. 29, 1977

[30] Foreign Application Priority Data

Jul. 5, 1976 [JP] Japan ................. 51-78895

[51] Int. Cl.² .................. C25B 1/16; C25B 1/26
[52] U.S. Cl. ........................ 204/98; 204/128
[58] Field of Search .................. 204/98, 128

[56] References Cited

U.S. PATENT DOCUMENTS 3,547,791 12/1977 Mellish et al. .................. 204/98
3,893,897 7/1975 Raetzsch .......................... 204/98

Primary Examiner—R. L. Andrews
Attorney, Agent, or Firm—Cooper, Dunham, Clark, Griffin & Moran

[57] ABSTRACT

In carrying out electrolysis of alkali halide in an electrolytic cell having anode and cathode chambers separated by a cation exchange membrane by feeding an aqueous alkali halide solution into the anode chamber to produce halogen gas in the anode chamber and caustic alkali and hydrogen gas in the cathode chamber, the electrolytic cell is pressurized at higher than atmospheric pressure to obtain various improved results.

9 Claims, 2 Drawing Figures

PROCESS FOR ELECTROLYSIS OF ALKALI HALIDE

This invention relates to an improved process for electrolysis of an aqueous alkali halide solution. More particularly, this invention relates to a process for electrolysis of an aqueous alkali halide solution in an electrolytic cell having anode and cathode chambers separated by a cation exchange membrane, wherein the improvement comprises carrying out electrolysis in an electrolytic cell which is pressurized at above atmospheric pressure to produce pressurized halogen gas and hydrogen gas, so that electrolysis may be conducted at a higher temperature and at a lower voltage with easy recovery of waste heat from both gases.

Heretofore, there have been known the mercury process and the diaphragm process for production of halogen and hydrogen gas by electrolysis. According to the mercury process, due to the difficulty of operating in a closed system, electrolysis has generally been conducted under reduced pressure and it was the usual practice to carry out electrolysis while preventing leaking of halogen gas outside of the system. In addition, generation of hydrogen gas is generally effected in a denuding cell provided outside of the electrolytic cell. In the diaphragm process, a diaphragm composed principally of asbestos having no ion-permselectivity has been used. Therefore, caustic alkali produced in the cathode chamber back migrates into the anode chamber to reduce current efficiency. For prevention of this, an aqueous sodium chloride solution in the anode chamber is usually allowed to pass through the diaphragm into the anode chamber. If, therefore, the anode chamber is pressurized in such a diaphragm process, the amount of chlorine gas dissolved in the aqueous sodium chloride solution is increased, all of which is then converted, when transferred into the cathode chamber, into hypochlorite salts thereby adversely affecting the quality of caustic alkali produced. For this reason, electrolysis has generally been effected in a diaphragm process while keeping the anode chamber at a reduced pressure.

In contrast, when a cation exchange membrane is used, increase in the amount of chlorine gas dissolved in anolyte caused by pressurization of anode chamber will only form anions such as hypochlorite anions as intermediate to be transferred into the caustic alkali in the cathode chamber. These anions, however, do not pass in large numbers through the cation exchange membrane due to its inherent properties. Accordingly, pressurization of the anode chamber will not result in deterioration of the quality of caustic alkali produced in the cathode chamber when a cation exchange membrane is used.

In those situations where gas is formed by electrolysis only from either the anode or the cathode, for example, when gas is formed only in anode, a porous anode may be used and electrolysis is carried out while urging the membrane toward anode, and discharging the gas from backside of the anode. By this method, undesired increase of electric resistance caused by shielding of current by the gas formed is substantially alleviated.

However, when gases are generated from both anode and cathode as in the present invention, the problem of current shielding by the gas generated from the counterelectrode cannot be overcome even when both electrodes are made porous and the diaphragm is urged toward one of them.

As an attempt to overcome the above problem, Japanese Patent Application laid open No. 74200/1974 proposes to use a diaphragm of a composite membrane comprising a cation exchange membrane and a metal layer such as mercury which is permselective for alkali metal, whereby the problem of current shielding by the hydrogen gas generated is removed, and also to liquefy the halogen gas under a pressure of 7 atmospheres or higher, whereby the problem of current shielding by gas is also avoided. However, in commercial application, it is difficult to prepare a cation exchange membrane which can stand high pressure operation at 7 atmospheres or higher necessary for liquefaction of a halogen gas. Thus, in commercial application, operational conditions for the generation of halogen gas are conducted at 7 atmospheres or lower.

The process of the present invention makes it possible to lower the electrolysis voltage by reducing current shielding as low as possible and raising the electrolysis temperature as high as possible by pressurizing the electrolytic cell at above atmospheric pressure in an electrolysis process, wherein an aqueous alkali halide solution is fed to the anode chamber in an electrolytic cell having anode and cathode chambers divided by a cation exchange membrane to produce halogen gas from the anode chamber and aqueous caustic alkali solution and hydrogen gas from the cathode chamber.

In fact, when the electrolytic cell is pressurized at higher than atmospheric pressure, the influence by current shielding can be alleviated. Since the electric resistance of the membrane and the solution is lowered with elevation of the temperature in the electrolytic cell, electrolysis voltage can be lowered in some operational conditions. However, even under pressurization of the electrolytic cell at higher than atmospheric pressure, too high an electrolysis temperature may sometimes result in increase of the electrolysis voltage with failure of the desired effect. Namely, when the electrolysis temperature is raised while keeping the inner pressure in the electrolytic cell constant, the electrolysis voltage is at first lowered. But there is a critical electrolysis temperature $T_c$ at which the electrolysis voltage becomes minimum. When the temperature exceeds the critical point, the electrolysis voltage abruptly increases. In other words, when electrolysis is carried out at a certain electrolysis temperature and the inner pressure in the electrolytic cell is increased, the electrolysis voltage is at first abruptly lowered. But it has been found that there is a specific critical pressure $P_c$ at or over which the electrolysis voltage can no longer be greatly changed.

With too much of an increase of inner pressure in an electrolytic cell, the difficulties of preparing a cation exchange membrane or an electrolytic cell with a structure which is sufficiently rugged to tolerate the increase become troublesome. Therefore, it is important to select electrolysis conditions with due consideration of the existing critical temperature $T_c$ and critical pressure $P_c$.

From various investigations about the relationship between the electrolysis conditions and $P_c$ and $T_c$, the present inventors have found the following correlation:

$$P_c - P_{H_2O} = ki(T_c - T_0) \quad (1)$$

Further, it has been found preferable to carry out electrolysis in the following pressure range:

$$5.0\,(P_c - P_{H_2O}) \geqq P - P_{H_2O} \geqq P_c - P_{H_2O} \quad (2)$$

In the above formulas, the symbols have the following meanings:

P : pressure in the upper part of electrolytic cell (atm.)

$P_{H_2O}$: partial pressure of water vapor in upper part of electrolytic cell (atm.)

$P_c$: critical pressure in the upper part of electrolytic cell (atm.)

$P_c - P_{H_2O}$: critical partial pressure of gases (atm.)

$P - P_{H_2O}$: partial gas pressure in the upper part of the electrolytic cell (atm.)

T : temperature in electrolytic cell (° C)

$T_c$: critical temperature in electrolytic cell (° C)

$T_O$: correction constant (° C)

i : current density (A/dm$^2$)

k : proportionality constant [atm/° C(A/dm$^2$)]

The value of $T_O$ is usually about 56° ± 5° C. The constant k is dependent on the electrolyte employed, its concentration, the structure of the electrolytic cell, e.g. its depth, distance in back of electrodes, electrode structure, the amount of circulated liquid, etc. and is determined when these parameters are fixed. The value k is usually about 0.00054 ± 0.0002. The practical range of i is from 10 to 100 A/dm$^2$.

The inner pressure P in the electrolytic cell is atmospheric or lower in the conventional electrolysis process. In such a case, as is apparent from formulas (1) and (2), with a practical electrolytic cell and within the practical range of i (the situation differs depending on the values of i and k), $P_{H_2O}$ is abruptly increased at an electrolysis temperature of 85° C or higher, whereby the electrolysis voltage is abruptly increased.

Partial pressure of gases generated is designated by $(P - P_{H_2O})$. When porous electrodes are employed and the cation exchange membrane is urged toward the anode side, the problem of current shielding caused by halogen gas can be removed. In this case, it is only necessary to take the partial pressure of hydrogen gas as $(P - P_{H_2O})$ into consideration. On the contrary, when the cation exchange membrane is urged toward the cathode side, it will suffice to consider only the partial pressure of the halogen gas in the electrolytic cell.

When the cation exchange membrane is located in the center between the electrodes, both halogen and hydrogen gas affect current shielding and it is necessary to consider partial pressures of both gases. In any case, when the difference between the inner pressure in the cathode chamber and that in the anode chamber is too large, the cation exchange membrane or electrodes may rupture due to too much force imposed thereon. Accordingly, it is preferred to maintain the difference between the pressures of both chambers at 0.5 atm. or lower. Further, as described later, various advantages can be attained by pressurizing both halogen and hydrogen gas.

Thus, in a process for electrolysis of an aqueous alkali halide solution using an electrolytic cell having anode and cathode chambers divided by a cation exchange membrane by feeding said solution into the anode chamber to produce halogen gas in the anode chamber and caustic alkali and hydrogen gas in the cathode chamber, various advantages can be obtained by carrying out the process while pressurizing the electrolytic cell at above atmospheric pressure. In particular, when electrolysis is carried out while pressurizing at a critical partial gas pressure or higher, many advantages can be obtained.

The first advantage is that electrolysis voltage can be decreased concurrently with electrolysis temperature.

The second advantage is that electrolysis temperature can be raised without an increase of electrolysis voltage.

The third advantage is that electrolysis can be effected at a high current density without damage to the cation exchange membrane. Particularly, when there is used a cation exchange membrane with two-layer structure having higher current efficiency, electrolysis can be effected at a high temperature and at high current density. A uni-layer cation exchange membrane, which will afford 80% or more of current efficiency when contacted on the cathode side with a 15% or higher conc. caustic alkali and has a high mechanical strength, is generally lower in electric conductivity. For obtaining a membrane having higher electric conductivity and current efficiency, it is presently preferred to use a two-layer membrane consisting of a thin layer high in current efficiency with lower electric conductivity and a layer having higher electric conductivity. Especially, it is preferred to conduct electrolysis by using such a two-layer membrane with the thin layer having lower electric conductivity facing the cathode side. When electrolysis is carried out using such a two-layer cation exchange membrane under atmospheric pressure at a high current density, boiling occurs within the membrane due to the heat generated at the layer with lower electric conductivity to form foams on the membrane surface to cause breakdown of the membrane, so that long-termed stable operation is difficult. For example, at 85° C and 30 A/dm$^2$, there may be formation of foams. On the other hand, according to the process of the present invention, when P is maintained at higher than atmospheric pressure, especially when $(P - P_{H_2O})$ is maintained at higher than the critical partial gas pressure, boiling within the membrane can be completely suppressed. Thus, it is possible to carry out electrolysis for extended periods of time while maintaining a high current efficiency under the conditions of high temperature and current density, for example, 85° C or higher and 30 A/dm$^2$ or above.

In addition to the advantages mentioned above due to pressurization in the electrolytic cell, the fourth advantage is the effect derived from easy pressurization of the systems around the electrolytic cell which is made possible by pressurization of the electrolytic cell. In industrial application, a number of electrolytic cells are arranged to perform electrolysis. In order to maintain the concentration and temperature of anolyte as well as of catholyte as uniform as possible, an anolyte tank is provided to circulate anolyte between the tank and the anode chamber and a catholyte tank is provided to circulate catholyte between the tank and the cathode chamber. In this case, it is also preferred to control the concentration, temperature and the amount of the liquid, to effect separation of gas and liquid, and to control the gas pressure in the anolyte and catholyte tanks. The anolyte and catholyte tanks are thereby preferably pressurized at above atmospheric pressure. By this method, not only the pressure can be controlled by pressurization in the electrolytic cell but also the driving force required for circulation can be reduced greatly. Thus, when the anolyte and catholyte tanks are pressurized, blowers for transporting the generated gases are not necessary. In conventional processes such as the mercury or diaphragm process, a blower is required for transporting gases to subsequent steps such as drying, hydrochloric acid synthesis, liquefaction, etc. In contrast, in the present invention, the procedure is made shorter to enable easier operation. Further, the pressure necessary for compression of the gases generated can be reduced or dispensed with.

The fifth advantage is that Joule's heat generated in the electrolytic cell can be recovered at high efficiency because of the higher temperature electrolysis which is made possible by the present invention. The heat thus generated can be cooled with cooling water. More advantageously, however, it is preferably utilized as heat source for concentration of caustic alkali, as disclosed by Japanese Patent Application No. 128857/1975 and No. 11231/1976. When double-effect utilization of the waste heat is intended at an electrolysis temperature lower than 85° C, no effective temperature difference can be obtained due to too high boiling point rise of the aqueous caustic alkali solution, so that no practical double-effect can be achieved. On the contrary, if it is possible to increase the electrolysis temperature above 85° C without increase in electrolysis voltage, as effected by the present invention, the sensible heat in the electrolyte can be utilized by double-effect for concentration of the aqueous caustic alkali solution.

The sixth advantage of the invention is that the higher temperature electrolysis made possible by the invention will enable utilization not only of the sensible heat of the electrolyte but also of the waste heat in the gases recovered. With the increase in the electrolysis temperature, the temperatures of the gases are higher. Accordingly, effective temperature differentials can be maintained without difficulty to facilitate recovery of the waste heat. But heat loss is greater by way of latent heat of the accompanying water vapor than by way of sensible heat of the gases. Therefore, it is important for effective recovery of the waste heat to pressurize at above atmospheric pressure and thereby minimize the amount of the accompanying water vapor per unit weight of gas.

Embodiments of the invention are described more in detail by reference to the accompanying drawings, in which:

FIG. 1 shows typical flow sheet of an embodiment in which the present invention is effectively utilized. For convenience of explanation, reference will be made to sodium chloride as a typical alkali halide, but it should be understood that the present invention is not limited to the flow sheet as shown in FIG. 1 or to the electrolysis of sodium chloride.

Figure 1:
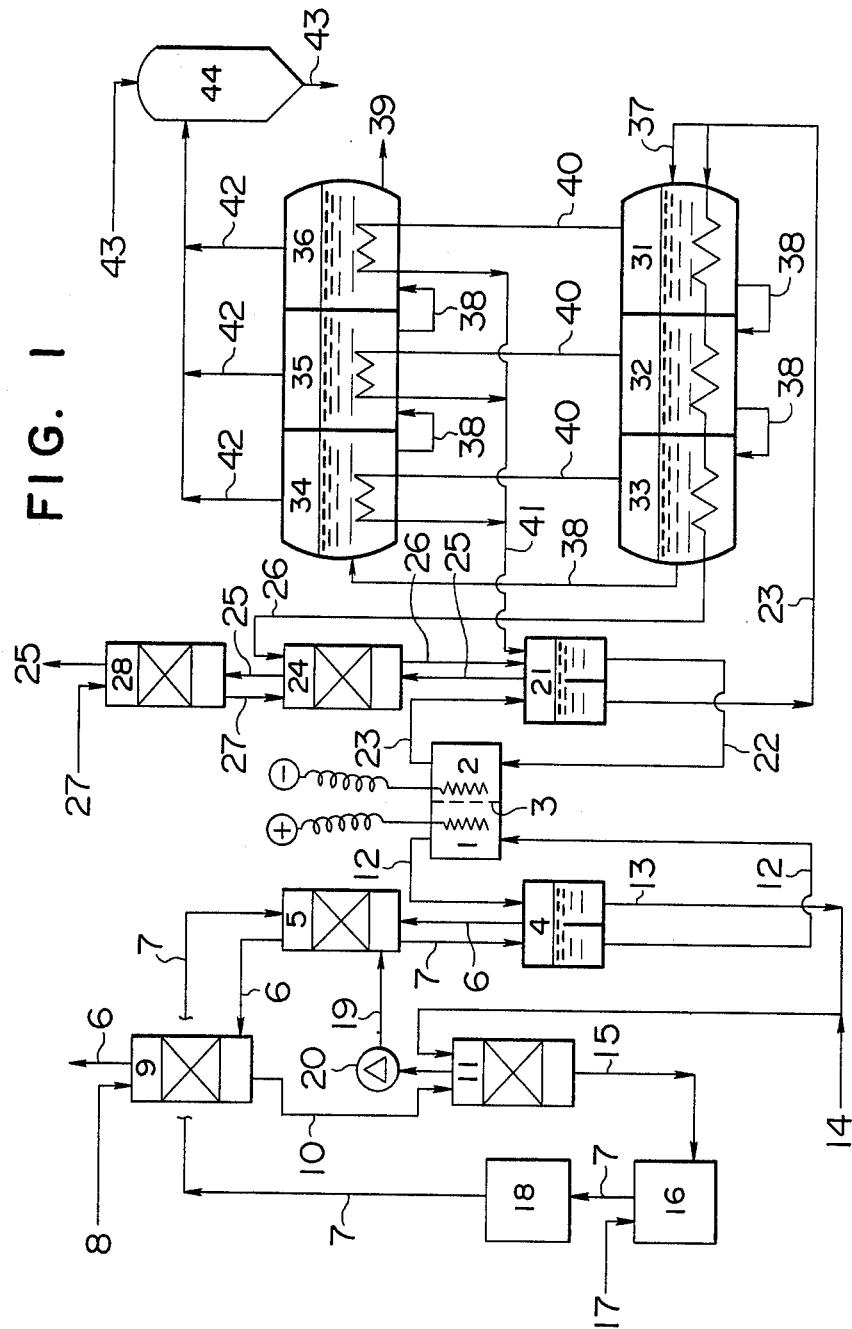
FIG. 1 shows an electrolysis cell and associated equipment.

In FIG. 1, 1 is the anode chamber, 2 the cathode chamber and 3 the cation exchange membrane. To explain first about the anolyte system, 4 is an anolyte tank, which is divided by means of a weir to separate salt water with lower temperature and higher concentration from a salt water with higher temperature and lower concentration. A packed tower or a porous plate tower is indicated by 5, and the chlorine gas separated in 4 passes through pipe 6 and is cooled in 5 with a low temperature, saturated salt water added through pipe 7 as make-up to 4 thereby to recover the waste heat. When sodium ions permeate through the cation exchange membrane 3 from the anode chamber 1 to the cathode chamber 2, water also permeates the membrane. The thus consumed water is supplemented by the cold water from line 8. This water further cools the chlorine gas in the porous plate tower or packed tower 9 to recover the waste heat. The water which has absorbed the waste heat is delivered through line 10 to the chlorine removing tower 11. 12 is the circulation line between 1 and 4, and 13 is the blow-down line for high temperature salt water. Hydrochloric acid from line 14 is added for decomposition of hypochloric acid and other materials which accumulate in the anolyte system. If it is desired to maintain pH in the anode chamber at a low value, hypochloric acid can be added to the circulation line 12 or to 4. If pH in the anode chamber is desired to be maintained as high as possible, HCl 14 may be added to the circulation line 13 between the anolyte tank and the tank for dissolving sodium chloride. The chlorine gas dissolved in 10 and 13 is separated in the chlorine removing tower 11 under reduced pressure. The salt water 15 after removal of chlorine and cooling is made up to saturated salt water by adding salt through conduit 17 to the salt dissolving tank 16. Impurities such as calcium, magnesium, sulfate ion etc. are removed from the salt water in the salt refining equipment 18. The chlorine gas is separated in tower 11 and is returned to tower 5 by means of the blower 20 through line 19.

Turning now to the catholyte system, 21 is the catholyte tank, which is also divided by a weir to permit separation of aqueous caustic soda solution with low temperature and low concentration through line 22 from an aqueous caustic soda solution with high temperature and high concentration through line 23. 24 indicates a packed tower or a porous plate tower. The hydrogen gas separated in 21 passes through conduit 25 and is cooled in 24 with aqueous caustic soda solution from pipe 26 which has been cooled as the result of being utilized as heat source for multiple-stage double-effect evaporator to recover the waste heat. The caustic soda concentration in catholyte 2 is controlled so as to maintain a high current efficiency of the cation exchange membrane and a low voltage. For this purpose, cold pure water is added through line for make-up. With this pure water, the hydrogen gas is further cooled in tower 28 to recover waste heat. 28 is a packed tower or a porous plate tower. 31, 32, 33, 34, 35 and 36 show a typical example of a three-stage double-effect evaporator as disclosed by Japanese Patent Application No. 11231/1976. Even if this evaporator is replaced by an evaporator with more stages and effects or, on the contrary, by a two-stage double-effect evaporator, a conventional double-effect evaporator or a single evaporator, the effect of heat recovery of the present invention can be obtained. 31, 32 and 33 represent the group of the first effect evaporators divided into three chambers. These are heated via heat exchangers with the high temperature caustic soda 23 as heat source. The aqueous caustic soda solution 37 similar to that produced in the electrolytic cell is fed to 31 and the concentrated caustic soda is successively fed to the next stage. Finally, the concentrated caustic soda is taken out of the system through the line 29. The water vapor 40 evaporated in 31, 32 and 33 is provided for reuse as heat source for the group of the second effect evaporators which are also divided into three chambers 34, 35 and 36. The resulting condensed water is collected in pipe 41 and returned to tank 21. The water vapor evaporated in 34, 35 and 36 is collected through lines 42 and condensed by cooling with the cooling water from pipe 43 in the barometric condenser 44. In the present invention, it is preferred to maintain all or a part of 1, 2, 4, 5, 9, 21 24 and 28 at a pressure higher than atmospheric pressure.

Referring now to preferable examples, scope and conditions in practice of the present invention, alkali halides suitable for the present invention include sodium chloride, potassium chloride, sodium bromide, potassium bromide, lithium bromide and so on. The caustic alkali is exemplified by caustic soda, caustic potash, caustic lithium and the like. As a cation exchange membrane, any cation exchange membrane having permselectivity for cations of 75% or more can be employed. As a matrix constituting the membrane, any of hydrocarbon type resin and fluorocarbon type resin may be used but perfluoro compounds are particularly preferred because of their resistance to chlorine gas, bromine gas, etc. The cation exchange groups are not limited, but membranes with sulfonic acid group do not have a high current efficiency in spite of their high electric conductivity, while weakly acidic groups such as carboxylic or phosphoric acid groups, sulfonamide group, and alkyl sulfonamino group have lower electric conductivity in spite of improved current efficiency. Accordingly, in order to compensate for these drawbacks, namely to provide a membrane with high current efficiency and high electric conductivity, it is preferred to use a two-layer structure membrane consisting of a layer having sulfonic acid groups and a layer with high current efficiency and low electric conductivity. The cation exchange membrane is preferably reinforced with backings such as of fluorocarbon fiber nets so as to have sufficient mechanical strength.

The pressure in the electrolytic cell can be as high as 7 atm. or higher. But if the pressure is too high, there are various difficulties in construction and safety. Thus, the pressure is preferably 5 atm. or lower. The inner pressures in the anolyte tank, catholyte tank and equipment corresponding to 5, 6, 7, and 8 in FIG. 1 are maintained also higher than atmospheric pressure to obtain the effect of the present invention.

The temperature in the electrolytic cell is preferably 85° C to 90° C or higher, in order to achieve the effect of the present invention. However, a temperature above 150° C is not presently preferred since corrosion resistant materials for this temperature level are available only with difficulty.

As the structure of the electrolytic cell, a bipolar type electrolyzer is preferred for industrial application. With a bipolar structure, the force imposed on the partition wall is equal to the difference in pressures between cathode and anode chambers when the pressure is increased according to the present invention. Thus, the bipolar structure can easily be made resistant to high pressures and is preferably used.

For pressurization and control at a pressure higher than atmospheric pressure in the electrolytic cell and the system surrounding the electrolytic cell, pressure controlling valves can be provided on equipment such as the catholyte tank, anolyte tank, hydrogen gas cooling tower, halogen gas cooling tower, etc. Alternatively, pressure control can be effected by providing pressure controlling valves or orifices at the outlet of the electrolytic cell. Further, the pressure in the electrolytic cell can also be controlled by controlling the amount of anolyte and catholyte circulated to the electrolytic cell.

EXAMPLE 1

As a cation exchange membrane, perfluorosulfonic acid membrane available under the name Nafion 315 (E. I. du Pont de Nemours & Co.) is used. This membrane is a double-layer membrane comprising a layer of 4 mils in thickness having a molecular weight of 1100 g per one equivalent of sulfonic acid exchange groups and a layer of 2 mils in thickness, with higher current efficiency and lower electric conductivity, having molecular weight of 1500 g per one equivalent of sulfonic acid exchange groups. There is used an electrolytic cell having anode and cathode chambers divided by this ion-exchange membrane. This electrolytic cell has an effective current passage area of 1.2 m square. As an anode, a porous anode of a titanium expanded mesh with opening ratio of 60% which has been coated with ruthenium oxide, titanium oxide and zirconium oxide may be employed. As a cathode, a porous cathode of an expanded iron mesh with an opening ratio of 60% is used. The electrolytic cell is a bipolar electrolyzer in which the partition wall is made of explosion-bonded titanium plate and iron plate. Between the cathode mesh and the iron surface of the partition wall is provided an interval of 45 mm and also between the anode mesh and titanium surface of the partition wall an inverval of 45 mm. Seventy four unit cells of this type are connected electrically in series to be assembled in a bipolar electrolyzer for use.

The anolyte is charged from the anolyte tank in parallel to each anode chamber in each electrolytic cell at the rate of 600 liter/hour. The catholyte is circulated in parallel between the catholyte tank and each cathode chamber in each electrolytic cell at the rate of 600 liter/hour. For adjusting the caustic soda concentration at the outlet of the cathode chamber, pure water is made up in the catholyte tank. Saturated salt water and hydrochloric acid are added into the anolyte tank to adjust the salt concentration at 2.5 N and proton concentration at 0.05 N at the outlet of the anode chamber. The temperature at the outlet of the electrolytic cell is adjusted by controlling the temperature in the catholyte tank with cooling water. Discharging from each anode chamber and cathode chamber is effected in state of a vapor-liquid mixed phase and the inner pressures in each anode chamber and cathode chamber are adjusted by providing an orifice in each outlet nozzle, controlling the opening ratio of the outlet valve or controlling the inner pressures in the anolyte tank and catholyte tank.

Figure 2:
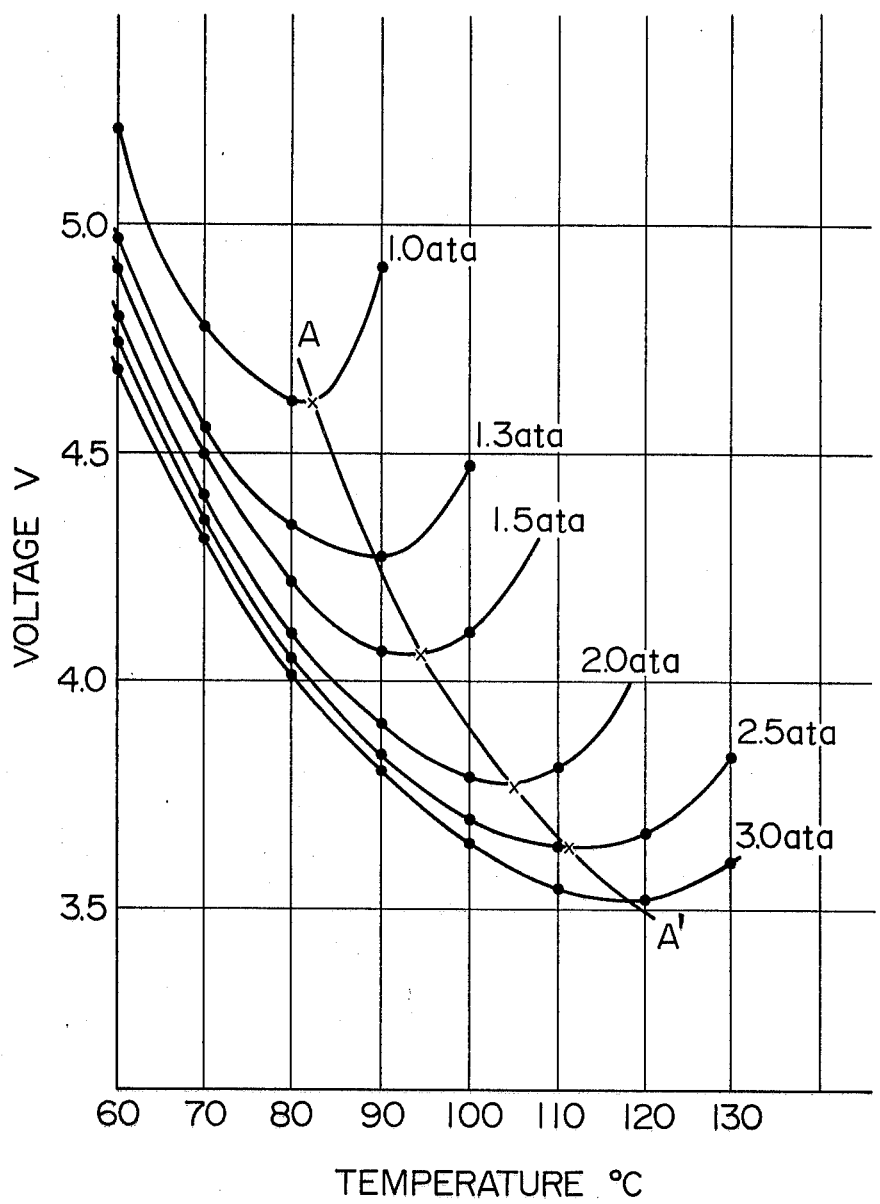
FIG. 2 shows a comparison of voltage and temperature at various cell pressures.

Thus, when electrolysis is carried out while maintaining the inner pressure in cathode chamber higher by 0.1 atm. than that in the anode chamber at 40 A/dm$^2$, the data of electrolysis voltage, electrolysis temperature and inner pressure in the cathode chamber thereby obtained are as shown in FIG. 2. As will be seen from this graph, the electrolysis voltage per one cell is at its minimum at about 85° C when the pressure in the electrolytic cell is atmospheric; but as the increase in the pressure in the electrolytic cell, the temperature $T_c$ at which the electrolysis voltage becomes minimum is higher. The points for $T_c$ corresponding to various inner pressures P in the electrolytic cell define the line A - A'. Similarly, by varying the current density $i$ at 20 A/dm$^2$, 40 A/dm$^2$ and 60 A/dm$^2$, corresponding A - A' curves are determined. From these results, the correlation between $P_c$, $T_c$ and $i$ can be formulated according to the equation (1) to obtain the following empirical formula:

$$P_c - P_{H_2O} = 0.000535 \, i(T_c - 56° \text{C}) \tag{3}$$

In FIG. 2, the region where P is 1.0 atm. or higher, especially on the left side of A - A' line, shows the region of critical partial gas pressure or higher, wherein the effect of the present invention is obtained.

EXAMPLE 2

The cation exchange membrane employed has a doublelayer structure comprising a layer of perfluorosulfonic acid of 6 mils in thickness having molecular weight of 1200 g per one equivalent of exchange groups and a layer of perfluorocarboxylic acid of 0.2 mils in thickness having molecular weight of 1200 g per one equivalent of exchange groups. The electrolytic cell is the same as in Example 1 except for the cation exchange membrane. The electrolysis conditions are also the same as in Example 1 except that the caustic soda concentration at the outlet of cathode chamber is adjusted at 25%. The data obtained are analyzed in the same manner as in Example 1 to confirm that the formula (3) also holds good here. The current efficiency is 93% and it is confirmed that no damage due to boiling in the membrane will occur in the region on the left side of the A - A' line.

EXAMPLE 3

Electrolysis is conducted using substantially the same electrolytic cell and electrolysis conditions. But electrolysis is conducted by maintaining the inner pressure in the anode chamber higher by 0.1 atm. than that in the cathode chamber, thereby urging the cation exchange membrane toward the cathode.

The data obtained are analyzed similarly as in Example 1. When analysis is made by regarding the value of inner pressure in the anode chamber as the inner pressure in the electrolytic cell, the formula substantially the same as (3) is confirmed to be valid.

EXAMPLE 4

Electrolysis is carried out by the system as shown in FIG. 1 using the same electrolytic cell and cation exchange membrane as used in Example 2, but under the conditions of electrolysis temperature of 102° C, current density of 40 A/dm$^2$, electrolysis voltage of 3.75 V, inner pressure in the cathode chamber of 2.9 atm. and inner pressure in the anode chamber of 2.8 atm. The concentration of the aqueous caustic soda solution in the cathode chamber is 25% and the concentration of the salt aqueous solution 2.5 N.

When electrolysis is carried out under the above conditions and concentration is effected in a three-stage double-effect evaporator using catholyte as heat source, 25% caustic soda can be concentrated to 43%.

The inner pressures in the anolyte tank 4, the chlorine gas cooling towers 9 and 5 are pressurized at 1.9 atm. The chlorine gas formed at 4.23 T/H by electrolysis is cooled in the chlorine gas cooling tower 9 down to 60° C and discharged out of the system. The waste heat contained in the chlorine gas discharged is 110 Tcal/H and the water content in the chlorine gas discharged is 0.13 T/H.

On the other hand, when the pressure in the chlorine gas cooling tower is maintained at 0.9 atm. and the chlorine gas is discharged out of the system at 4.23 T/H after cooling to 60° C, the waste heat contained in the chlorine gas discharged is 225 Tcal/H, and the water content accompanied in the chlorine gas discharged is 0.31 T/H. Thus, the content of waste heat and water accompanied is twice as much as the case when pressurized at 1.9 atm.

Then, the inner pressures in the catholyte tank 21 and the hydrogen gas cooling towers 24 and 28 are pressurized at 2.0 atm. The hydrogen gas formed at 0.120 T/H by electrolysis is cooled in the hydrogen gas cooling tower 28 down to 60° C and discharged out of the system. The content of waste heat in the discharged hydrogen gas is 100 Tcal/h and water content in the discharged gas 0.12 T/H. In contrast, when the inner pressure in the hydrogen cooling tower is maintained at 1.0 atm. and hydrogen gas is discharged out of the system after cooling to 60° C, the waste heat content in the discharged waste gas is 196 Tcal/H and water content accompanied in the hydrogen gas 0.28 T/H. This shows that the content of waste heat and water content is increased to twice as much as compared with the case when pressurized at 2.0 atm. When chlorine gas and hydrogen gas are discharged out of the system under pressure of about 2 atm., no blower is necessary for carrying the gases to subsequent steps such as hydrochloric acid synthesis tower or chlorine drying tower. But when chlorine gas and hydrogen gas are maintained at atmospheric and discharged out of the system, a blower is required which is equipped for conveying the gases to subsequent steps.

What we claim is:

1. In a process for electrolysis of an aqueous alkali halide solution in an electrolytic cell having anode and cathode chambers separated by a cation exchange membrane by feeding an aqueous alkali halide solution into the anode chamber to produce halogen gas in the anode chamber and caustic alkali and hydrogen gas in the cathode chamber, the improvement which comprises carrying out electrolysis while maintaining the pressure in the electrolytic cell at a pressure which is above 1 atm. but not above 7 atm. and maintaining the partial gas pressure in the electrolytic cell within the range from a critical partial gas pressure to five times the critical gas pressure.

2. A process as in claim 1, wherein the critical partial gas pressure is proportional to current density and electrolysis temperature.

3. A process as in claim 1, wherein electrolysis is carried out while maintaining electrolysis temperature at from 85° C to 150° C.

4. A process as in claim 1, wherein electrolysis is carried out while pressurizing an anolyte tank connected to the anode chamber and a catholyte tank connected to the cathode chamber at from above 1 atm. to 7 atm.

5. A process as in claim 1, wherein the hydrogen gas separated from caustic alkali is cooled outside the electrolytic cell under pressurized state to recover heat.

6. A process as in claim 1 wherein the halogen acid gas separated from the aqueous alkali halide solution is cooled outside the electrolytic cell under pressurized state to recover heat.

7. A process as in claim 1, wherein the cation exchange membrane has a double-layer structure comprising a layer with high electric conductivity and a layer with low electric conductivity.

8. A process as in claim 1 wherein the pressure is up to 5 atm.

9. A process as in claim 1 wherein the pressure is up to 5 atm.

* * * * *